United States Patent
Czaja et al.

(10) Patent No.: US 6,567,666 B2
(45) Date of Patent: *May 20, 2003

(54) FORWARD LINK INTER-GENERATION SOFT HANDOFF BETWEEN 2G AND 3G CDMA SYSTEMS

(75) Inventors: Stanislaw Czaja, Cardiff, CA (US); Kraig Anderson, San Diego, CA (US)

(73) Assignee: Infineon Technologies North America Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,987

(22) Filed: May 20, 1999

(65) Prior Publication Data

US 2002/0037726 A1 Mar. 28, 2002

Related U.S. Application Data

(60) Provisional application No. 60/110,666, filed on Dec. 2, 1998.

(51) Int. Cl.[7] .............................. H04Q 7/20; H04Q 7/00; H04B 7/216
(52) U.S. Cl. ..................... 455/442; 455/422; 455/436; 455/437; 455/442; 455/443; 455/448; 370/331; 370/332; 370/335
(58) Field of Search ................................. 455/436, 442, 455/444, 426; 370/331, 332, 335; 445/422, 437, 443, 448, 432

(56) References Cited

U.S. PATENT DOCUMENTS

| | | | |
|---|---|---|---|
| 5,101,501 A | * 3/1992 | Gilhousen et al. ............. 455/33 |
| 5,267,261 A | 11/1993 | Blakeney, II et al. |
| 5,533,014 A | 7/1996 | Willars et al. ................. 370/18 |
| 5,682,416 A | 10/1997 | Schmidt et al. ............... 379/58 |
| 5,697,055 A | 12/1997 | Gilhousen et al. |
| 5,946,621 A | * 8/1999 | Chheda et al. ............... 455/440 |
| 5,953,320 A | * 9/1999 | Williamson et al. ......... 370/252 |
| 5,999,815 A | * 12/1999 | TenBrook et al. ........... 455/436 |
| 5,999,816 A | * 12/1999 | Tiedemann, Jr. et al. ... 455/437 |
| 6,058,107 A | * 5/2000 | Love et al. .................. 370/332 |

* cited by examiner

Primary Examiner—Edward F. Urban
Assistant Examiner—Meless Zewdu
(74) Attorney, Agent, or Firm—Fish & Richardson P.C.

(57) ABSTRACT

In a CDMA cellular radiotelephone system, a soft handoff (SHO) is performed when a mobile station communicates with a new inter-generation base station, without interrupting communications with the old base station. Currently, a SHO can only be used between CDMA channels having identical frequency assignments and within the same system generation (i.e., 2G↔2G, or 3G↔3G, where 2G is a second generation system, and 3G is a third generation system). The proposed IS-2000 standard for a 2G↔3G handoff is a hard handoff or "Break-Before-Make" procedure, which greatly reduces the quality of service (QOS). The present invention allows for SHO between second and third generation CDMA systems (2G↔3G and 3G↔2G), by modifying the proposed messaging structure. This provides a smooth service transition when a mobile station travels from one service area (i.e., 2G), to another service area (i.e., 3G), using the SHO or "Make-Before-Break" approach.

11 Claims, 8 Drawing Sheets

| | | IS-2000 | | | | |
|---|---|---|---|---|---|---|
| | | RC-1 | RC-2 | RC-3 | RC-4 | RC-5 |
| IS-95 A/B | RS-1 | SHO | No | ISBSHO | ISHO | No |
| | RS-2 | No | SHO | No | No | ISBSHO |

|  |  | IS-2000 | | | | |
|---|---|---|---|---|---|---|
|  |  | RC-1 | RC-2 | RC-3 | RC-4 | RC-5 |
| IS-95 A/B | RS-1 | SHO | No | ISBSHO | ISHO | No |
|  | RS-2 | No | SHO | No | No | ISBSHO |

FIG. 6

| PILOT_PN | 9 |
| --- | --- |
| PWR_COMB_IND | 1 |
| FOR_FUND_CODE_CHAN | 8 |
| FOR_SUP_INCLUDED | 0 or 1 |
| FOR_SUP_CHAN_REC Record | 0 or 9 or (1 + 8 x NUM_FOR_SUP) |
| IS-95B_IS-2000 | 1 |
| RADIO_CONFIG | 4 |
| IG_T_DROP | 4 |
| IG_DROP_TSHD | 4 |

FIG. 7

| Base Station Type | Pilot Ec / Ior | Îor/Ioc | Traffic Eb/Nt | Data Rate |
|---|---|---|---|---|
| IS-95B RS-1 | −7 dB | 10 dB | varied | 9600 |
| IS-2000 RC-4 | −7 dB | 10 dB | 4.0 dB | 9600 |

FIG. 8

| Base Station Type | Pilot Ec / Ior | Îor/Ioc | Traffic Eb/Nt | Data Rate |
|---|---|---|---|---|
| IS-95B RS-1 | −7 dB | 4 dB | varied | 9600 |
| IS-2000 RC-4 | −7 dB | 4 dB | 7.55 dB | 9600 |

FIG. 9

FORWARD LINK INTER-GENERATION SOFT HANDOFF BETWEEN 2G AND 3G CDMA SYSTEMS

This application claims priority from U.S. Provisional Application No. 60/110,666, filed Dec. 2, 1998, entitled "Forward Link Inter-Generation Soft Handoff Between 2G And 3G CDMA Systems".

BACKGROUND OF THE INVENTION

1. Field of the Invention

The present invention relates generally to communication systems, and more particularly, to a method for forward link inter-generation soft handoff between second generation (2G) and third generation (3G) Code Division Multiple Access (CDMA) systems.

2. Description of the Related Art

One commonly used type of cellular radiotelephone communication system is referred to as a Code Division Multiple Access (CDMA) system. In a CDMA system, the radio signals share the same frequency spectrum at the same time, in contrast to previous Frequency Division Multiple Access (FDMA) or Time Division Multiple Access (TDMA) systems. One current CDMA standard, known as the second generation standard or 2G, is designated as TIA/EIA-95-A/B (or IS-95-A/B), and is herein incorporated by reference. More recently, a new third generation (3G) CDMA standard has been proposed and has been designated as IS-2000 (previously IS-95-C) or CDMA2000, and is herein incorporated by reference. As the new 3G systems are installed, cellular systems will contain a mix of both old 2G systems and the new 3G compatible systems.

In a typical CDMA cellular radiotelephone communication system, a mobile station communicates with a base station having the strongest available signal. In order to track the available signals, the mobile station maintains a list of available base stations. Specifically, each base station in the CDMA system transmits an unmodulated "pilot" signal on a set of predetermined frequencies. A mobile station receives the pilot signals and determines which pilot signals are the strongest. A "searcher" unit located in the mobile station commonly performs the signal detection and strength measurement functions.

The results from the searcher are reported to the current (i.e. active) base station. The base station then instructs the mobile station to update a list of available base stations maintained by the mobile station. The list is sub-divided into three operative sets—an active set, a candidate set, and a neighbor set. The active set contains a list of the base stations with which the mobile station is currently communicating (typically 1–4 base stations). The candidate set is a list of base stations which may move into the active set, and the neighbor set is a list of base stations which are being monitored, but less frequently.

As the mobile station moves and its currently active base station signal weakens, the mobile station must access a new base station. Based upon the results of the searcher, and the instructions received back from the base station, the mobile station will update its sets, and communicate with a different base station. In order for communication transmissions to appear seamless to the user of the mobile station, the communication link must be handed off to the next base station. Ideally, this handoff would establish a new link before terminating the first link. This type of handoff is known as a soft handoff (SHO) or "Make-Before-Break."

Presently, a SHO cannot occur between two different generations of CDMA systems. The 3G system has been designed to provide backward compatibility with the 2G system at the signaling and call processing level. However, since these two systems employ different modulation schemes and spreading rates, they are not naturally compatible at the physical layer. Therefore, at the service boundaries between the 2G and 3G systems, a hard handoff, also known as a "Break-Before-Make" method, has been proposed.

In this type of hard handoff, the connection with a currently active base station (i.e., 2G) is terminated before the new service with the new base station (i.e., 3G) is established. This type of service disruption lowers the quality of service (QOS) for the cellular telephone user. In this scenario, if the mobile station is engaged in a voice service, the user will most likely experience unpleasant voice quality degradation or even call drop. If the mobile station is transferring data, significant transmission delays (due to retransmission errors) will likely occur. In fact, the current standard causes a minimum of 10 frames to be lost, before service is restored.

Thus, it would be desirable to provide a soft handoff between two different generations of CDMA systems, in order to avoid the disadvantages associated with the currently proposed hard handoff scheme.

SUMMARY OF THE INVENTION

The present invention is a modification to the proposed IS-2000 specification, in order to provide soft handoffs on forward links between two different generations of CDMA systems. In general, the present invention modifies the proposed messaging structure to allow for reporting of the generation type of the base stations. Two different embodiments are disclosed, as well as two possible soft handoff procedures. The present invention is not limited to the disclosed preferred embodiments, however, as those skilled in the art can readily adapt the teachings of the present invention to create other embodiments and applications.

In a first embodiment, a system configuration parameter is added to the General Handoff Direction Message, and Extended Handoff Direction Message. The Neighbor List Message and Extended Neighbor List Message are updated to include information concerning both systems' base stations. A selection based soft handoff is used to perform the handoff between inter-generation systems. The selection is based on the signal strength of the received pilot signals.

In a second embodiment, four parameters are added to the PILOT_PN record of the General Handoff Direction Message. The four parameters are a generation identification parameter, a radio configuration parameter, a drop timer parameter and a drop threshold parameter. Based upon the values of the generation identification parameter and the radio configuration parameter, either a selection based soft handoff or a true handoff is performed. The true handoff combines signals from both generation systems, before dropping a current base station in favor of the stronger other generation base station. The drop parameters may be used to provide a sufficient time overlap for the two different base stations, and to allow a system designer to tune the network.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein:

FIG. 6 a table illustrating the permissible inter-generation soft handoffs according to one embodiment of the present invention;

FIG. 7 is a table illustrating the additional parameters added to the PILOT_PN record of the General Handoff Direction Message according to a preferred embodiment of the present invention;

FIG. 8 is a table of the simulation parameter settings used for an AWGN computer simulation;

FIG. 9 is a table of the simulation parameter settings used for a fading computer simulation;

DETAILED DESCRIPTION

The following description is provided to enable any person skilled in the art to make and use the invention and sets forth the best modes contemplated by the inventor for carrying out the invention. Various modifications, however, will remain readily apparent to those skilled in the art.

The current second generation (2G) CDMA systems, designated as TIA/EIA-95-A/B (or IS-95-A/B) systems, are being upgraded and will ultimately be replaced by the third generation (3G) CDMA systems. The air interface of the 3G (IS-2000) system uses a new modulation scheme to allow better spectral efficiency, as well as different spreading factors. However, a part of the new 3G system, which operates within the same channel bandwidth as the old 2G system, is required to be compatible with the 2G system at the signaling and call processing level. The reverse link of the 3G system, though, employs coherent demodulation, whereas the reverse link of the 2G system employs non-coherent demodulation. Thus, in the 3G specification, there was no attempt to make these two systems compatible at the physical layer.

Additionally, the forward links of the two systems use different modulation methods (QPSK (3G) vs. BPSK (2G)), which require some modifications within the new 3G system's demodulator. However, since the IS-2000 terminal (i.e. mobile station) must be able to operate in the IS-95-A/B network, the new 3G terminal is required to be able to switch its mode of operation from one system to the other automatically.

In practice, it is impractical to perform a reverse link SHO between 2G and 3G systems because the 3G base station cannot demodulate a 2G reverse link and vice versa (coherent vs. non-coherent, different modulations, etc.). However, according to the present invention, a method for performing a SHO on the forward link is disclosed that can be implemented with only a few minor modifications to the proposed 3G systems.

A mobile station receiver comprises a "rake" receiver and several other components. The rake receiver consists of several (at least three for narrow band CDMA), demodulating elements (or "fingers"). These multiple demodulating elements or fingers function like a garden rake to "rake" in the signals, thus the name. Each of these demodulating elements is capable of independently tracking and demodulating a multipath component received from a single base station or a signal from several base stations (up to the number of demodulating elements in the rake receiver). Therefore, it is possible to configure one demodulating element according to the 2G standard and at least one other demodulating element to the 3G standard. Thus, a single mobile station can be used across a mixed generation system.

Figure 1:
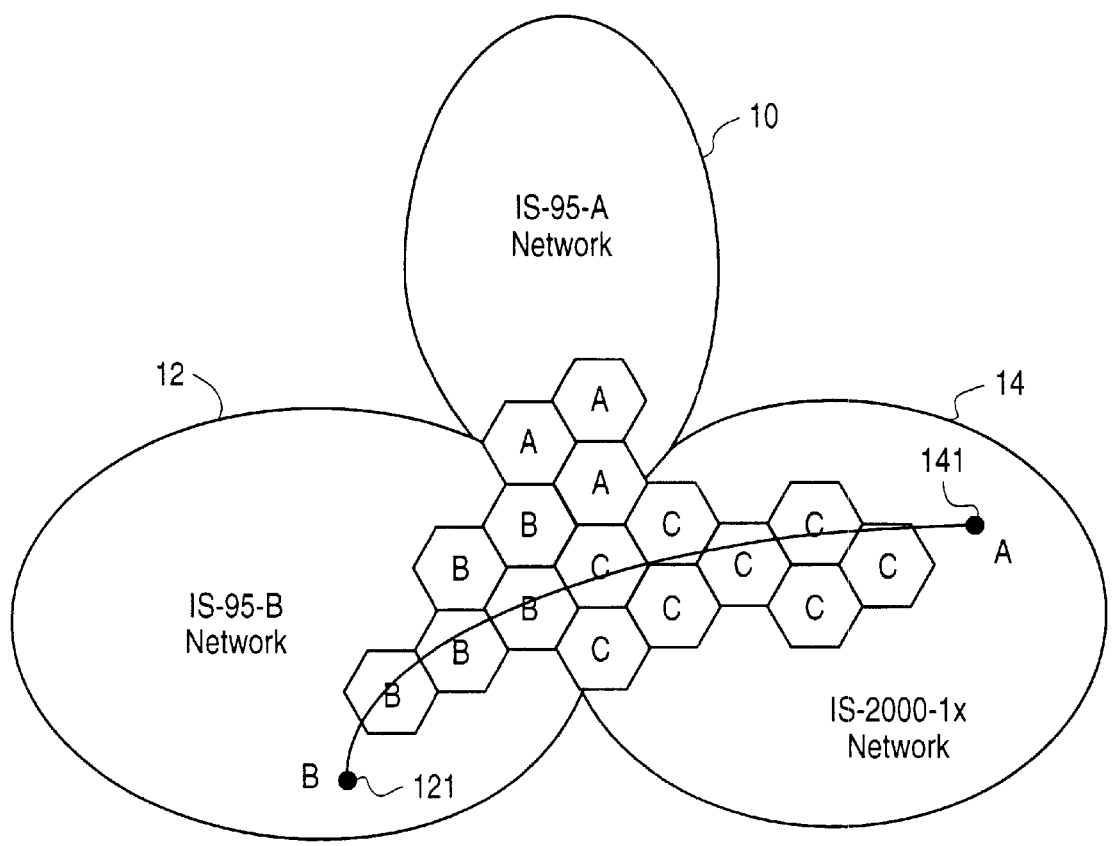
FIG. 1 is diagram illustrating one possible IS-2000 deployment scenario.

In one preferred embodiment, the deployment model of the 3G system consists of a partial overlay of the current 2G (IS-95-A/B) networks 10,12 and the new 3G (IS-2000) network 14, as shown in FIG. 1. As the mobile station travels from one generation 121 to another generation 141 of the network, according to the proposed hard handoff, the station will be forced to drop the current service before it re-establishes the service on the other generation network. According to the present invention, a few modifications to the standard proposed message formats in the IS-2000 specification are made, in order to provide a SHO for the forward link. Specifically, changes to the messaging structure are proposed to allow for the reporting of 3G base stations. The present invention thus allows for a soft handoff between two generations of systems, which allows for maintaining the QOS across the generation boundaries.

The present invention creates a mechanism for informing the mobile station about the surrounding network, such as the network parameters (data rates, etc.) and whether the network is a 2G, 3G, or 2G/3G mix. This can be achieved by an addition of a 1-bit field into the General Handoff Direction Message, and Extended Handoff Direction Message. Additionally, each base station in the 2G/3G service overlap area must have all the other system's base stations stored into the Neighbor List Message and Extended Neighbor List Message. This can be achieved by adding a new definition to the NGHBR_CONFIG field.

Figure 2:
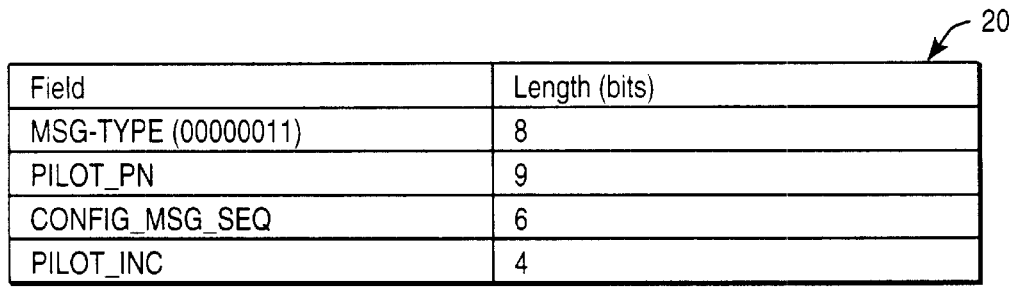
FIGS. 2 and 3 are tables illustrating a Neighbor List Message.
Figure 3:
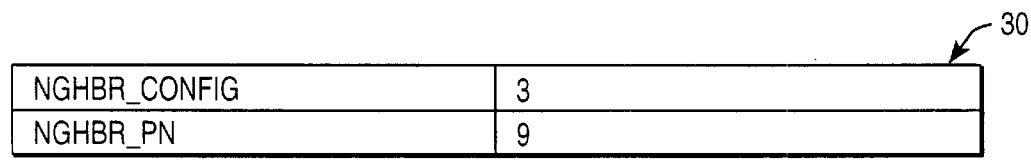
Figure 4:
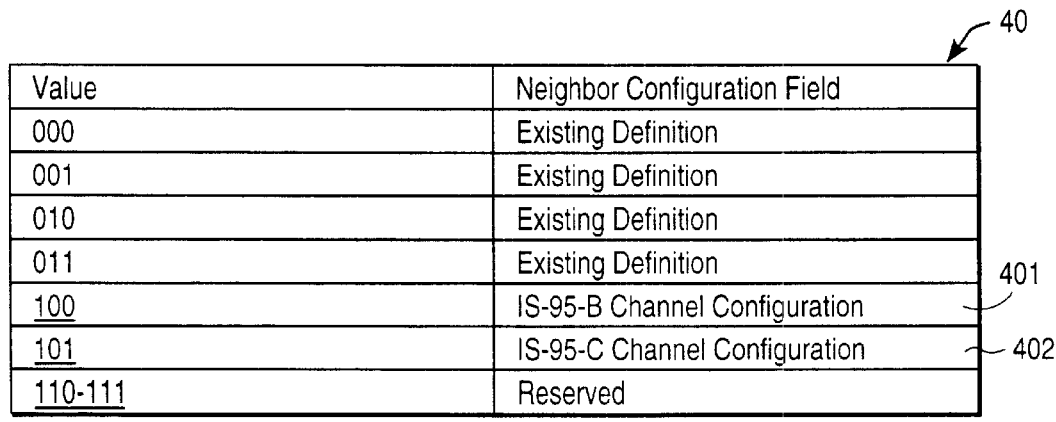
FIG. 4 is a table illustrating one embodiment of the modified Neighbor Configuration Table.

Preferably in the network deployment, the same base station controller will supervise the two different generations of base stations. Therefore, for the generation overlay area, the Neighbor List Message and the Extended Neighbor List Message include both types of systems. FIGS. 2 and 3 illustrate the definition of the Neighbor List Message 20,30. The Neighbor Configuration Table 40 is then modified as shown in FIG. 4, wherein the underlined entries are examples of the proposed modifications. Specifically, two new channel configuration entries 401, 402 have been added (one for the 2G and one for the 3G system).

After receiving the Neighbor List Message or the Extended Neighbor List Message, the mobile station measures the pilot signals in the active, candidate and neighbor sets and reports the strengths to the base station, using the Pilot Strength Measurement Message. This procedure is performed by the searcher, which computes the strength of each pilot by adding the ratio of the received pilot energy per chip, Ec, to the total received spectral density (noise and signal), Io.

Figure 5:
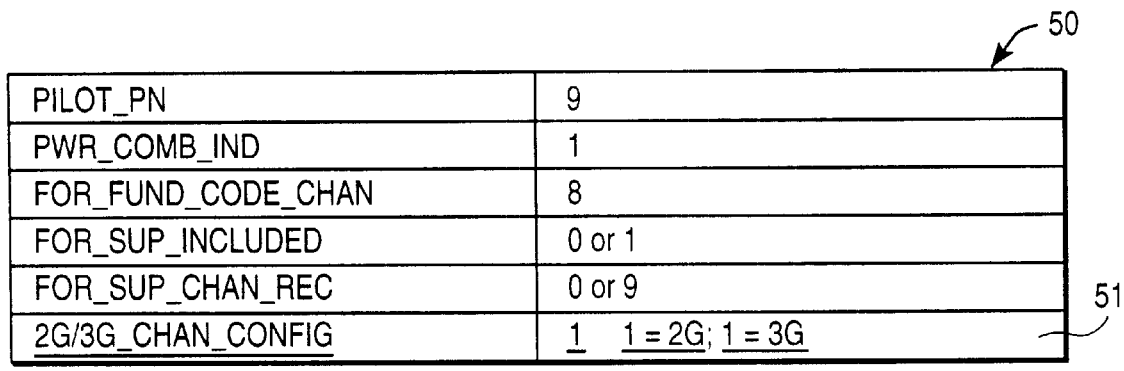
FIG. 5 is table showing an embodiment of the modified PILOT_PN record.

Since the base station knows which of the detected and reported pilots are associated with second or third generation system, the base station can use this information to manage the forward link SHO capability. Specifically, compatible base stations are added to the mobile station's active set. This is done through the General Handoff Direction Message (GHDM) and Extended Handoff Direction Message (EHDM). A field indicating the generation (2G, 3G) 51 of the associated PILOT_PN record 50 is also added. The PILOT_PN record 50 of the message can be modified, for example, as illustrated in FIG. 5. The underlined field "2G/3G_CHAN_CONFIG" 51 has been added.

Before the GHDM message is sent to the mobile station indicating that the forward link SHO between the 2G and 3G systems should be performed, the base station controller allocates the necessary channel resources for each of these two systems (since, as noted above, the same controller supervises both generations).

Since each mobile station contains at least three demodulating elements (fingers) in its rake receiver, it may assign one of these fingers to a demodulated signal arriving from the 2G base station, while the remaining fingers demodulate the signal arriving from the 3G base station (or vice-versa). According to the proposed specification, each IS-2000 mobile station must be capable of demodulating an IS-95-B signal, therefore it is possible to demodulate these two signals independently (note that in an overlay deployment the two modulation signals will be orthogonal to each other). Additionally, since the computational requirements (channel decoding) and the interleaver memory of IS-2000 mobile stations are large (to sustain the maximum data rates), the capability to demodulate and decode these two independent channel configurations are already within the capability of the currently defined mobile stations.

According to this embodiment of the present invention, the SHO procedure may be performed as follows:

1. If the mobile station is in the 2G/3G overlay area, the base station includes pilots belonging to both systems into the Neighbor List Message (NLM).

2. The mobile station measures the pilot strength of all base stations (2G and 3G) and reports them to the base station.

3. If the 2G (or 3G) pilot Ec/Io>T_ADD threshold, the base station includes this pilot into the mobile station's active set.

4. The mobile station continuously demodulates the current generation base station assignment.

5. The mobile station assigns one or more demodulating fingers to the "other generation" base station signal, and it demodulates and decodes the information independently from the current assignment.

6. After decoding the first good frame from the "other generation" base station, the mobile station starts a Tm counter, and upon its expiration, reports the event in Handoff Completion Message (the Tm counter must be defined, as is used to determine the SHO timing).

7. The base station may now drop the "other generation" pilots (channels) from the mobile station's active set, thus completing the SHO.

The above described embodiment is a selection based SHO, or inter-generation selection based SHO (ISBSHO), that is, in an overlay region the mobile station receives two base station signals (one from each generation) and decides which signal is stronger. The base station with the strongest signal is then selected and the weaker signal is dropped as described above.

A second type of SHO is referred to herein as a "true" SHO. As defined herein, a true SHO occurs when the two signals from the two different generation systems are actually combined together, before one signal is dropped. Currently, when a mobile station is communicating with a base station, a finger is assigned to each multi-path component. The signals are then combined together before the bit is decoded. The true SHO of the present invention proposes assigning a least one finger to the "other" generation signal, such that after the signals are demodulated and interleaved, the soft symbols are combined and decoded to produce an output bit. Thus, in contrast to the first embodiment of the present invention, the mobile station is actively using two signals from two different inter-generation base stations simultaneously, in an overlay region. Once one signal becomes too weak (i.e. the signal strength drops below a threshold), that signal is dropped and the mobile station communicates only with the stronger base station.

A true SHO approach, however, can only be used if the coding rates of the two different signals are the same. If the coding rates are different, the signals must be decoded sequentially, and the selection based SHO must be used. Thus, in mixed generation and signal environment, sometimes a selection based SHO scheme is required. When a true SHO can be performed, though, it is preferred. A second embodiment of the present invention will now be described which implements a true SHO, when possible.

The table shown in FIG. 6 specifies when each type of inter-generation soft handoff is permitted. As seen in the table, the 2G systems support two data rates (RS-1 and RS-2), while the 3G systems may have five or more data rates. As illustrated, in addition to the SHO between RS-1↔RC-1 and RS-2↔RC-2, a true SHO (SHO) can be performed when the coding and the data rates transmitted on both forward links are the same (i.e. RS-1↔RC-4). The inter-generation selection based soft handoff (ISBSHO) can be performed when both forward link data rates are equal but the coding rates are different (i.e. RS-1↔RC-3 and RS-2↔RC-5). As new configurations are added, the present invention may be applied as described herein, based upon the data and coding rates.

When performing a true SHO, the mobile station assigns one or more of its fingers to demodulate the IS-95A/B base station signal and the remaining fingers to the IS-2000 base station. The received signal is demodulated according to the modulation and spreading parameters of the respective base station, and the demodulated symbols are combined in the maximum ratio (MR) fashion before decoding, similar to the normal SHO. For the 2700 bps and 1500 bps rates of RC-4, after demodulation, the symbols are de-punctured and then only the information symbols (not the CRC symbols) are combined. When performing an ISBSHO, the received signal is demodulated according to the modulation and spreading parameters of the IS-95A/B and IS-2000 base stations. Signal components from the same base station are added in an MR combiner and then decoded sequentially by the decoder. The best frame can be then selected based on the frame quality.

Since an IS-2000 mobile station is capable of receiving and demodulating both an IS-95A/B and an IS-2000 signal, a simple extension to the message structure will allow the simultaneous demodulation of signals from both generations permitting soft handoffs. This can be achieved by adding four new fields to the PILOT_PN record 70 of the General Handoff Direction Message. The following four new parameters are added to the PILOT_PN record 70 of the General Handoff Direction Message: a generation identification parameter (IS-95B_IS-2000) 71, a radio configuration parameter (RADIO_CONFIG) 72, an inter-generation drop timer parameter (IG_T_DROP) 73, and an inter-generation drop threshold (IG_DROP_TSHD) 74. These additions are illustrated in the table of FIG. 7.

The IS-95B_IS-2000 field 71 is used to identify the generation type (2G or 3G) of a base station. The RADIO_CONFIG field 72 specifies the data rate, spreading rate and code rate (i.e. all the modulation parameters). For example, if the IS-95B_IS-2000 field 71 is a "0" (2G), then only 1 bit is used for the RADIO_CONFIG field 72 to specify the data rate—"0" for RS-1, and "1" for RS-2. If the IS-95B_IS-2000 field 71 is a "1" (3G), the RADIO_CONFIG field 72 defines which configuration is applicable (RC-1–RC-5). Additional 3G configurations are envisioned, so in the preferred embodiment the RADIO_CONFIG field 72 has been shown as 4 bits, however fewer bits may be used, or additional bits added to provide for even more configurations.

The IG_T_DROP field 73 is a timer used to determine the length of the SHO. For example, the IG_T_DROP timer 73 may be implemented dynamically, so that each base station specifies its value independently. This would allow the network to be "tuned" dynamically. In a preferred embodiment, the range of values of the IG_T_DROP timer 73 is 0–15 frames. Finally, the IG_DROP_TSHD field 74 is a threshold value that uses an energy measure to determine when to drop a base station. Specifically, the IG_DROP_TSHD field 74 uses the Ec/Io energy measure to determine when a signal is too weak to be of any use, and is therefore dropped. In a preferred embodiment, the IG_T_DROP timer 73 is used for the selection based SHO, while the IG_DROP_TSHD threshold 74 is used for the true SHO. However, the two measures may also be used together to further refine the SHO mechanism. Once one signal is dropped, the mobile station is tuned to use only the other base station.

According to a preferred embodiment of the present invention, the SHO procedure may be performed as follows:

When a mobile station is in the IS-95A/B-IS-2000 overlay area, pilots belonging to both generations are included in the Neighbor List Messages (NLM) or Neighbor List Update Message (NLUM).

The mobile station measures the pilot strength of all base stations (2G and 3G) and reports their strength to the active base station in the Pilot Strength Measurement Message (PSMM).

If the inter-generation candidate pilot Ec/Io reported in the PSMM message is larger than the T_ADD threshold, the base station includes this pilot in the GHDM message, indicating system generation, radio configuration and handoff parameters.

The mobile station then assigns one or more demodulating fingers to the "other-generation" base station signal, and demodulates and decodes the information depending on the radio configuration and handoff parameters.

When all the inter-generation handoff requirements specified in the GHDM message (IG_T_DROP and/or IG_DROP_TSHD) are satisfied, the mobile station terminates its transmission on the "current" generation link (using the SHO permitted as shown in FIG. 6) and starts transmitting on the "other" generation link.

The mobile station completes the inter-generation handoff by sending the Handoff Completion Message.

Figure 10:
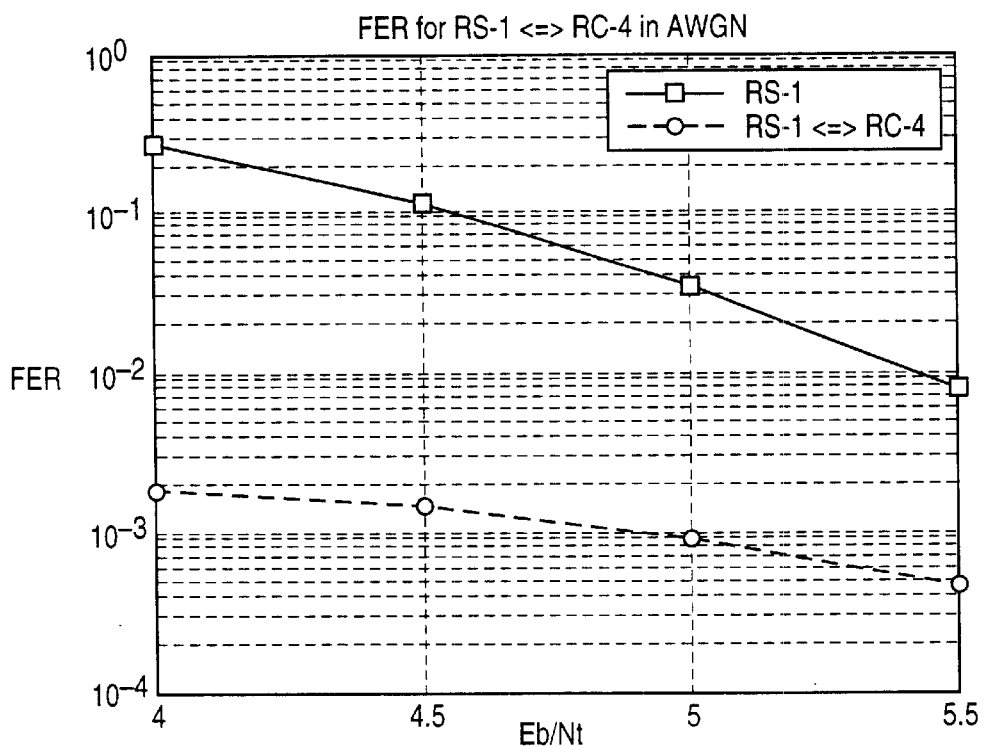
FIG. 10 is a graph of the results of the AWGN computer simulation.
Figure 11:
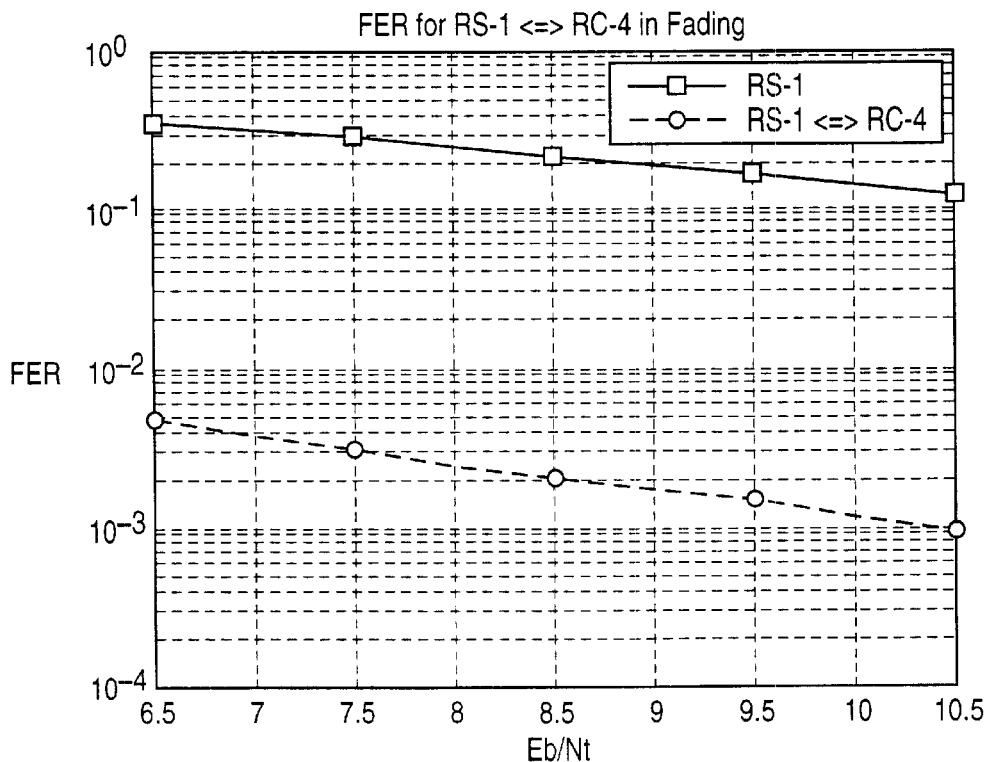
FIG. 11 is a graph of the results of the fading computer simulation.

Computer simulations of the true SHO are shown in FIGS. 10 and 11. Simulations were run in an AWGN and a fading environment. For the AWGN case, the simulation parameters were set as shown in FIG. 8. The RS-1 curve shows the FER when just the single path from the IS-95B base station is used. The RS-1↔RC-4 curve shows the gain when one path from each base station is used in a true inter-generation SHO scenario. The simulation parameters for the fading case are shown in FIG. 9, with the mobile station speed set at 30 km/hr. For the fading environment, the RS-1 curve shows the FER when just the single path from the IS-95B base station is used. The RS-1↔RC-4 curve shows the gain when one path from each base station is used in the true inter-generation SHO scenario. The ISBSHO performance was not simulated since the performance gains are well understood by those skilled in the art and depend only on the power of the link from each of the two different generation base stations.

As described, the present invention provides a simple mechanism to facilitate inter-generation soft handoffs on a forward traffic channel in a mixed-generation CDMA cellular radiotelephone system. The inclusion of a true inter-generation soft handoff into the IS-2000 standard can significantly simplify the deployment of 3G systems, since there is no need to include IS-95B channel elements in the IS-2000 base stations. Also, the soft handoff overcomes the shortcomings of the proposed hard handoff procedure, without increasing the system complexity or hardware requirements. No additional complexity is added to the mobile stations since each IS-2000-1x mobile station must already be capable of demodulating an IS-95-B signal, and it can demodulate two different generation signals independently.

Figure 12:
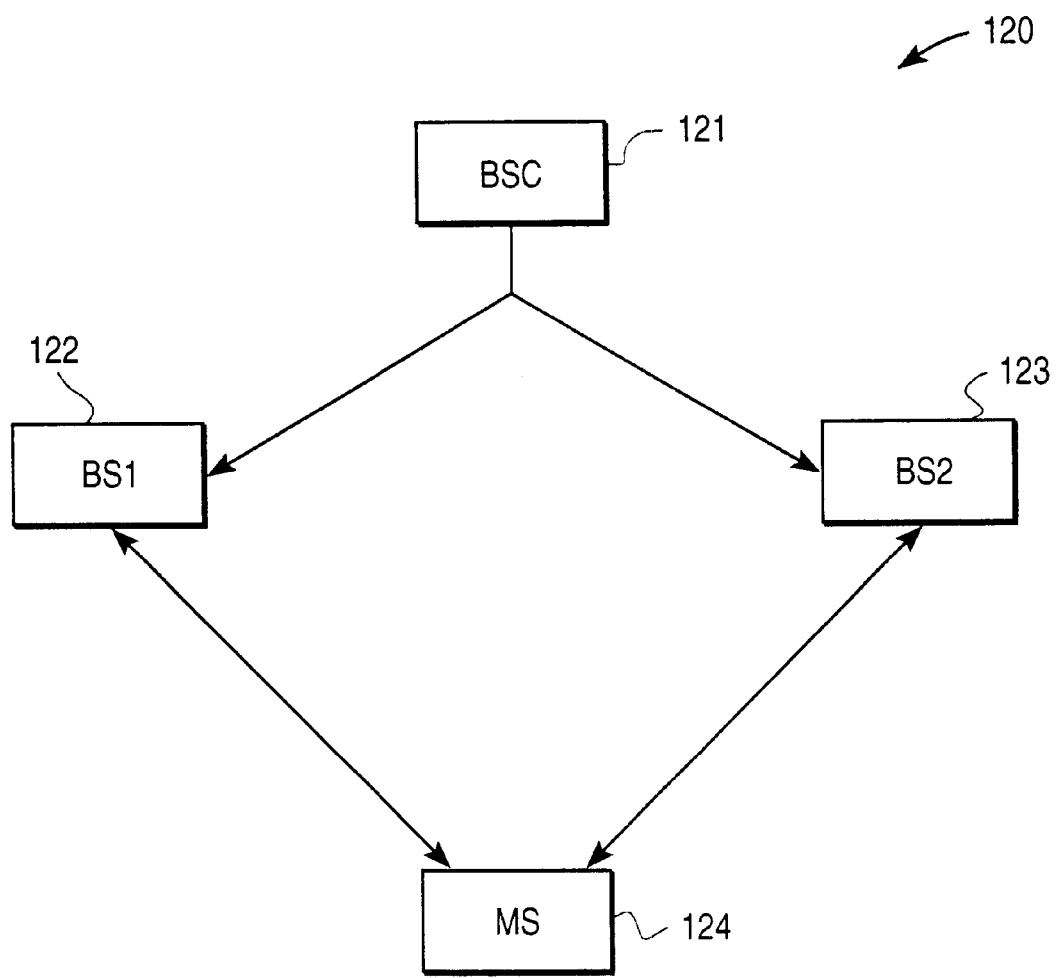
FIG. 12 is a block diagram of a CDMA system configured to operate according to the present invention.

An example of a CDMA system 120 incorporating the present invention is shown in FIG. 12. A mobile station 124 communicates with a first base station 122. As the mobile station moves, it must be handed off to a closer base station 123. As new 3G systems are introduced, a CDMA system 120 will have a mixture of both 2G and 3G systems. According to the present invention, a common base station controller 121 controls both the 2G and 3G base stations 122, 123. In this case, for example, the first base station 122 may be a 2G system and the second base station 123 may be a 3G system.

If the mobile station 124 and the second base station 123 are configured according to the present invention, the mobile station 124 makes a forward link with the second base station 123, before terminating the link with the first base station 122. This "soft handoff" improves the QOS for the mobile station, as compared to a hard handoff. Interestingly, this improvement can be accomplished without significant additional hardware complexity.

Those skilled in the art will appreciate that various adaptations and modifications of the just-described preferred embodiments can be configured without departing from the scope and spirit of the invention. For example, additional messages may be added or the data structures modified in the proposed IS-2000 specification to produce the same results as those described herein. Furthermore, the present invention may be extended to the European CDMA implementations, to allow handoff between GSM and W-CDMA. Therefore, it is to be understood that, within the scope of the appended claims, the invention may be practiced other than as specifically described herein.

What is claimed is:

1. A method to be performed by a mobile device, the method comprising:
   receiving a first data signal from a first system that uses a first modulation scheme;
   receiving a second data signal from a second system that uses a second modulation scheme, the second modulation scheme being different from the first modulation scheme;
   receiving from a system controller modulation information identifying the modulation scheme used by the second system;

performing a soft handoff between the first and second system by:
  using the received modulation information to select a soft handoff procedure from a plurality of soft handoff procedures including a first procedure and a second procedure;
  if the first procedure is selected:
    demodulating and decoding the first data signal while independently demodulating and decoding the second data signal; and
    dropping the first data signal upon determining that the second data signal is stronger than the first data signal;
  if the second procedure is selected:
    demodulating the first data signal while independently demodulating the second data signal;
    combining the first and second data signals and decoding the two signals together; and
    dropping the first data signal upon determining that the second data signal is stronger than the first data signal.

2. The method of claim 1, wherein:
the first system is an IS-95 CDMA system and the second system is an IS-2000 CDMA system.

3. The method of claim 1, wherein:
the first and second modulation schemes differ in that they have different spreading rates.

4. The method of claim 1, wherein:
each modulation scheme has a spreading rate, a data rate and a coding rate; and
the received modulation information identifies the spreading, data, and coding rates of the second modulation scheme.

5. The method of claim 4, wherein using the received modulation information to select a handoff procedure includes:
using the received modulation information to determine whether the first and second modulation schemes have the same spreading, data, and coding rates.

6. The method of claim 5, wherein:
the first procedure is selected if the first and second modulation schemes have the same data rates but different spreading and coding rates.

7. The method of claim 5, wherein:
the second procedure is selected if the first and second modulation schemes have the same data and coding rates, but different spreading rates.

8. The method of claim 1, wherein determining that the second data signal is stronger than the first data signal includes:
determining that the strength of the first data signal has dropped below a threshold energy value.

9. The method of claim 8, wherein:
the received modulation information specifies the threshold energy value.

10. The method of claim 1, wherein determining that the second data signal is stronger than the first data signal includes:
determining that the number of good frames that have been decoded from the second data signal meets a threshold number of frames.

11. The method of claim 10, wherein:
the received modulation information specifies the threshold frame number of frames.

* * * * *